(12) United States Patent
Ando et al.

(10) Patent No.: US 9,350,179 B2
(45) Date of Patent: May 24, 2016

(54) CHARGING DEVICE

(71) Applicant: DENSO CORPORATION, Kariya, Aichi-pref. (JP)

(72) Inventors: Shinji Ando, Nukata-gun (JP); Seiji Iyasu, Anjo (JP); Sadahisa Onimaru, Chiryu (JP); Kazuyoshi Obayashi, Chita-gun (JP)

(73) Assignee: DENSO CORPORATION, Kariya-city (JP)

( * ) Notice: Subject to any disclaimer, the term of this patent is extended or adjusted under 35 U.S.C. 154(b) by 66 days.

(21) Appl. No.: 13/898,687

(22) Filed: May 21, 2013

(65) Prior Publication Data

US 2013/0308230 A1    Nov. 21, 2013

(30) Foreign Application Priority Data

May 21, 2012    (JP) .................. 2012-115458

(51) Int. Cl.
*H02H 3/00* (2006.01)
*H02H 9/08* (2006.01)
(Continued)

(52) U.S. Cl.
CPC ............. *H02J 7/0031* (2013.01); *B60L 3/0069* (2013.01); *B60L 3/04* (2013.01); *B60L 11/1803* (2013.01); *B60L 11/1809* (2013.01); *B60L 11/1814* (2013.01); *B60L 11/1816* (2013.01); *B60L 15/007* (2013.01); *H02J 7/027* (2013.01); *H02P 27/00* (2013.01); *B60L 2220/54* (2013.01); *B60L 2220/56* (2013.01); *B60L 2240/547* (2013.01); *B60L 2240/549* (2013.01); *B60L 2250/10* (2013.01); *Y02T 10/641* (2013.01);
(Continued)

(58) Field of Classification Search
CPC ......... Y02T 90/12; Y02T 90/14; Y02T 90/16; Y02T 90/127; Y02T 10/641; B60L 11/1857
USPC .......................................................... 361/42
See application file for complete search history.

(56) References Cited

U.S. PATENT DOCUMENTS

| | | | |
|---|---|---|---|
| 6,864,688 B2 * | 3/2005 | Beutelschiess | B60L 3/00 324/541 |
| 7,292,042 B2 * | 11/2007 | Morita et al. | 324/509 |

(Continued)

FOREIGN PATENT DOCUMENTS

| | | |
|---|---|---|
| JP | 2007-101424 | 4/2007 |
| JP | 2007-187454 | 7/2007 |

(Continued)

*Primary Examiner* — Thienvu Tran
*Assistant Examiner* — Lucy Thomas
(74) *Attorney, Agent, or Firm* — Nixon & Vanderhye PC (57) ABSTRACT

A charging device for a battery of a vehicle includes an insulation resistance detecting circuit, a charging circuit, a leak current detecting circuit and a decoupling circuit. The insulation resistance detecting circuit includes a coupling capacitor, and is disposed between the battery and a vehicle body for detecting an insulation resistance between the battery and the vehicle body. The charging circuit converts an alternating current supplied from an alternating current source into a direct current and charges the battery in a state without insulting the input terminal and the output terminal and in a state where the vehicle body is coupled to an earth. The leak current detecting circuit detects a leak current between the charging circuit and the earth. The decoupling circuit decouples the insulation resistance detecting circuit from one of the battery and the vehicle body during a charging of the battery.

6 Claims, 4 Drawing Sheets

(51) Int. Cl.
  *H02J 7/00* (2006.01)
  *B60L 11/18* (2006.01)
  *H02P 27/00* (2006.01)
  *B60L 3/00* (2006.01)
  *B60L 3/04* (2006.01)
  *B60L 15/00* (2006.01)
  *H02J 7/02* (2016.01)

(52) U.S. Cl.
  CPC .......... *Y02T 10/645* (2013.01); *Y02T 10/7005* (2013.01); *Y02T 10/7072* (2013.01); *Y02T 90/127* (2013.01); *Y02T 90/14* (2013.01)

(56) References Cited

U.S. PATENT DOCUMENTS

2005/0073317 A1    4/2005  Yamamoto et al.
2007/0247770 A1   10/2007  Ishikawa et al.
2012/0091954 A1*   4/2012  Matsuki ................. 320/109

FOREIGN PATENT DOCUMENTS

| JP | 2010-008356 |   | 1/2010  |
| JP | 2010-239845 |   | 10/2010 |
| JP | 2010239845  | * | 10/2010 |

* cited by examiner

HIGH-VOLTAGE BATTERY POSITIVE TERMINAL

FIG. 4

HIGH-VOLTAGE BATTERY NEGATIVE TERMINAL

FIG. 5

CHARGING DEVICE

CROSS REFERENCE TO RELATED APPLICATION

This application is based on Japanese Patent Application No. 2012-115458 filed on May 21, 2012, the disclosure of which is incorporated herein by reference.

TECHNICAL FIELD

The present disclosure relates to a charging device used for charging a battery and including an insulation resistance detection circuit.

BACKGROUND

As an example of a charging device for charging a battery to which an insulation resistance detection circuit is connected, a charger disclosed in JP2010-239845A has been known.

The charger is used to charge an in-vehicle battery using an alternating current source. The in-vehicle battery is mounted in an electric vehicle, and is insulated from a body of the vehicle.

An insulation monitoring unit is connected to the in-vehicle battery to detect an insulation resistance between the in-vehicle battery and the vehicle body. The insulation monitoring unit includes a coupling capacitor, an alternating-current voltage generator, and an alternating current detector. An end of the coupling capacitor is connected to a negative terminal of the in-vehicle battery. The other end of the coupling capacitor is connected to an end of the alternating-current voltage generator. An end of the alternating current detector is connected to the other end of the alternating-current voltage generator, and the other end of the alternating current detector is connected to the vehicle body.

The charger includes a charging circuit and an earth detector. The charging circuit converts an alternating current supplied from the alternating current source into a direct current. The charging circuit is provided with an alternating-to-direct current converter. An input terminal of the charging circuit is connected to the alternating current source, and an output terminal of the charging circuit is connected to the in-vehicle battery.

The earth detector detects an earth fault between the output terminal of the charging circuit and the earth. The earth detector includes two resistors and a current detector. An end of each of the resistors is coupled to the output terminal of the charging circuit. An end of the current detector is coupled to the other end of each of the resistors, and the other end of the current detector is connected to the earth.

When the in-vehicle battery is charged, the vehicle body is grounded to the earth. The charging circuit converts the alternating current supplied from the alternating current source into the direct current, and charges the in-vehicle battery with the direct current. The earth detector detects the earth fault between the output terminal of the charging circuit and the earth. Because the vehicle body is grounded to the earth, the earth detector also detects a leak current flowing between the in-vehicle battery and the vehicle body.

A terminal of the AC source is grounded to the earth as a reference. In a case where the input side and the output side of the charging circuit are not insulated, a terminal voltage of the in-vehicle battery relative to the earth is likely to change with time. As a result, the current flows from the vehicle body to the earth through the coupling capacitor of the insulation monitoring unit. With this, the earth detector operates to stop the charging of the in-vehicle battery. Therefore, the in-vehicle battery is not charged.

SUMMARY

It is an object of the present disclosure to provide a charging device for charging a battery of a vehicle, which is capable of properly charging the battery.

A charging device includes an insulation resistance detecting circuit, a charging circuit, a leak current detecting circuit, and a decoupling circuit. The insulation resistance detecting circuit includes a coupling capacitor. The insulation resistance detecting circuit is disposed between the battery and a vehicle body for detecting an insulation resistance between the battery and the vehicle body. The charging circuit has an input terminal to be coupled to an alternating current source and an output terminal to be coupled to the battery. The charging circuit converts an alternating current supplied from the alternating current source into a direct current and charges the battery in a state without insulating the input terminal and the output terminal and in a state where the vehicle body is coupled to an earth. The leak current detecting circuit is coupled to the charging circuit. The leak current detecting circuit detects a leak current flowing between the charging circuit and the earth. The decoupling circuit decouples the insulation resistance detecting circuit from one of the battery and the vehicle body during a charging of the battery.

In the above configuration, the insulation resistance detecting circuit is decoupled from one of the battery and the vehicle body by the decoupling circuit. Therefore, it is less likely that the current will flow from the vehicle body to the earth through the coupling capacitor. Accordingly, even if the input terminal and the output terminal of the charging circuit are not insulated, the battery can be properly charged.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Embodiments of the present disclosure will be hereinafter described with reference to the drawings. In the embodiments, a charging device is exemplarily employed to a charging device that charges a high-voltage battery mounted in a vehicle, such as an electric vehicle or a hybrid vehicle, using an alternating current source.

First Embodiment

A first embodiment will be described. Firstly, a structure of a charging device according to the first embodiment will be described with reference to FIG. 1.

Figure 1:
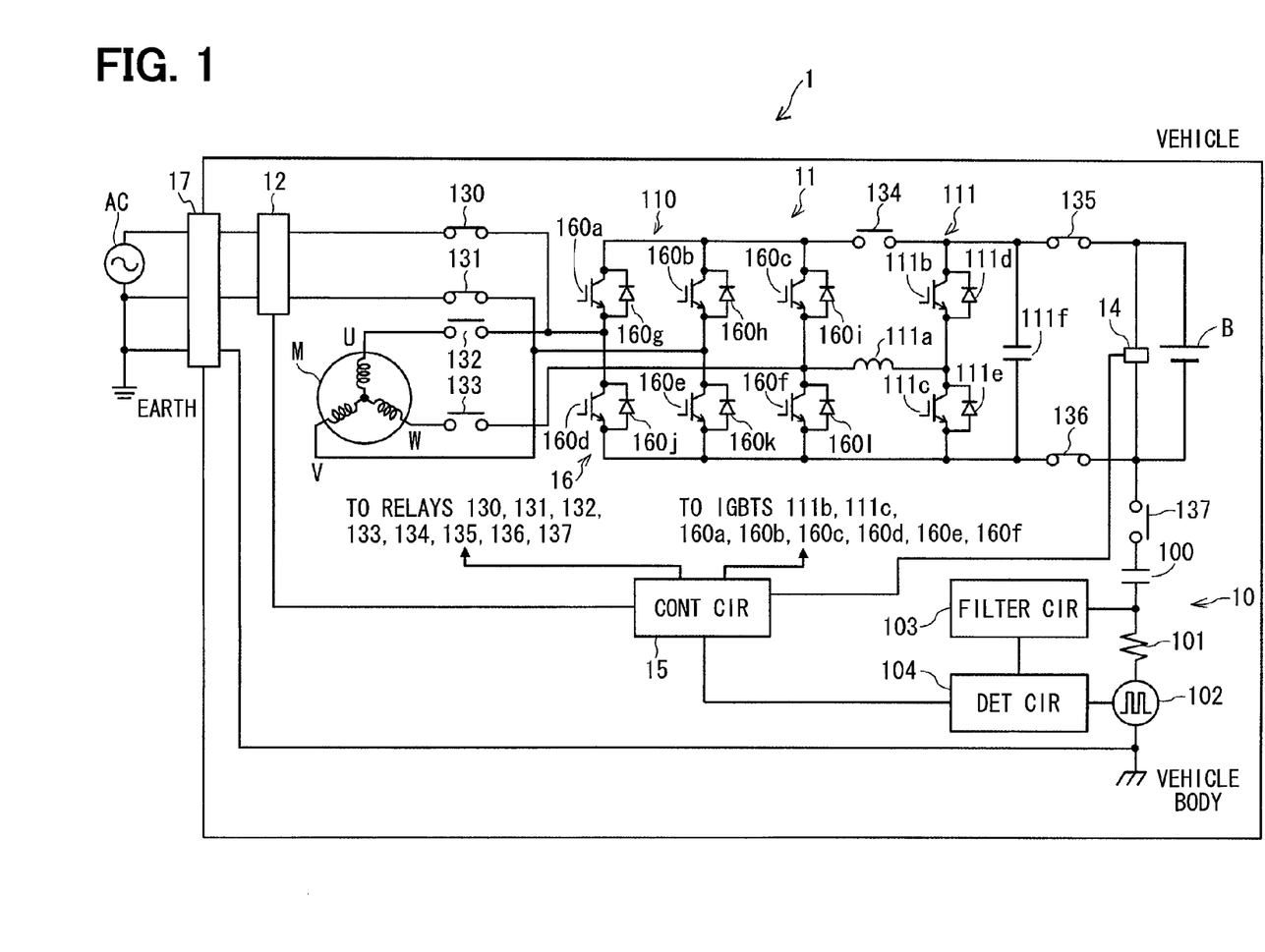
FIG. 1 is a circuit diagram of a charging device according to a first embodiment of the present disclosure.

A charging device 1 charges a high-voltage battery B using an alternating current source AC. The high-voltage battery B is mounted in an electric vehicle or a hybrid vehicle and insulated from a vehicle body. The charging device 1 charges the high-voltage battery B in a state where the vehicle body is grounded to the earth. In this case, an output terminal of the alternating current source AC is grounded to the earth as a reference.

The charging device 1 is mounted in the vehicle. The charging device 1 includes an insulation resistance detecting circuit 10, a charging circuit 11, a leak current detecting circuit 12, relays 130-137, a voltage sensor 14, and a control circuit 15.

The insulation resistance detecting circuit 10 is disposed between the high-voltage battery B and the vehicle body. The insulation resistance detecting circuit 10 detects an insulation resistance between the high-voltage battery B and the vehicle body. In particular, the insulation resistance detecting circuit 10 detects an insulation resistance between a negative terminal of the high-voltage battery B and the vehicle body. The insulation resistance detecting circuit 10 includes a coupling capacitor 100, a resistor 101, a signal generating circuit 102, a filter circuit 103 and a detection circuit 104.

The coupling capacitor 100 is an element that prevents a direct current component from the high-voltage battery B to the resistor 101, the signal generating circuit 102, and the filter circuit 103. A first end of the coupling capacitor 100 is coupled to a relay 137.

The resistor 101 is an element that provides an insulation resistance and a voltage-dividing circuit. A first end of the resistor 101 is coupled to a second end of the coupling capacitor 100.

The signal generating circuit 102 is controlled by the detecting circuit 104. The signal generating circuit 102 generates a pulse signal having a predetermined frequency. A first end of the signal generating circuit 102 is coupled to a second end of the resistor 101, and a second end of the signal generating circuit 102 is coupled to the vehicle body. Also, a control terminal of the signal generating circuit 102 is coupled to the detection circuit 104.

The filter circuit 103 filters noise of a high-frequency component from a pulse voltage divided by the voltage-dividing circuit provided by the resistor 101 and the insulation resistance. An input terminal of the filter circuit 103 is coupled to a coupling point between the coupling capacitor 100 and the resistor 101. An output terminal of the filter circuit 103 is coupled to the detection circuit 104.

The detection circuit 104 controls the signal generating circuit 102. Also, the detection circuit 104 detects the insulation resistance between the high-voltage battery B and the vehicle body based on an amplitude of the pulse voltage outputted from the filter circuit 103. A control terminal of the detection circuit 104 is coupled to the control terminal of the signal generating circuit 102. An input terminal of the detection circuit 104 is coupled to the output terminal of the filter circuit 103. An output terminal of the detection circuit 104 is coupled to the control circuit 15.

An input terminal of the charging circuit 11 is coupled to the alternating current source AC through an inlet 17, and an output terminal of the charging circuit 11 is coupled to the high-voltage battery B. The charging circuit 11 converts the alternating current supplied from the alternating current source AC into the direct current, and charges the high-voltage battery B with the direct current, without insulating the input side and the output side of the charging circuit 11. That is, the charging circuit 11 is a circuit without having a transformer that insulates the input side and the output side. In other words, in the charging circuit 11, the input terminal and the output terminal are electrically coupled. The charging circuit 11 includes a rectifying circuit 110 and a voltage increasing and reducing circuit 111.

The rectifying circuit 110 converts the alternating current supplied from the alternating current source AC into the direct current by rectifying the alternating current. The rectifying circuit 110 is provided by utilizing an inverter (power converter) 16 that supplies electric power to a motor M mounted in the vehicle. For example, the motor M is used for driving a compressor mounted in the vehicle.

The inverter 16 converts the direct current supplied from the high-voltage battery B into three-phase alternating currents, and supplies the three-phase alternating currents to the motor M. The inverter 16 includes IGBTs 160a-160f and diodes 160g-160l.

The IGBTs 160a-160f serves as switching element. The direct current is converted into the three-phase alternating currents by turning on and off the IGBTs 160a-160f. The IGBT 160a and the IGBT 160d are coupled in series to each other. The IGBT 160b and the IGBT 160e are coupled in series to each other. The IGBT 160c and the IGBT 160f are coupled in series to each other. In particular, an emitter of the IGBT 160a is coupled to a collector of the IGBT 160d. Likewise, an emitter of the IGBT 160b is coupled to a collector of the IGBT 160e, and an emitter of the IGBT 160c is coupled to a collector of the IGBT 160f.

A series circuit of the IGBT 160a and the IGBT 160d, a series circuit of the IGBT 160b and the IGBT 160e, and a series circuit of the IGBT 160c and the IGBT 160f are connected in parallel to each other. Collectors of the IGBTs 160a-160c are coupled to the relay 134. Emitters of the IGBTs 160d-160f are coupled to the relay 136. Gates of the IGBTs 160a-160f are coupled to the control circuit 15.

A series coupling point between the IGBT 160a and the IGBT 160d is coupled to the relay 130 and the relay 132. A series coupling point between the IGBT 160b and the IGBT 160e is coupled to the relay 131 and a V-phase terminal of the motor M. A series coupling point between the IGBT 160c and the IGBT 160f is coupled to the relay 133.

The diodes 160g-160l are elements that allow a current generated when the IGBTs 160a-160f are turned off and energy accumulated in a coil of the motor M is released. An anode of the diode 160g is coupled to the emitter of the IGBT 160a. Likewise, an anode of each of the diodes 160h-160l is coupled to the emitter of the corresponding IGBT 160b-160f. A cathode of the diode 160g is coupled to the collector of the IGBT 160a. Likewise, a cathode of each of the diodes 160h-160l is coupled to the collector of the corresponding IGBT 160b-160f.

The rectifying circuit 110 is provided by the diodes 160g, 160h, 160j, 160k.

The voltage increasing and reducing circuit 111 charges the high-voltage battery B by increasing or reducing the voltage of the direct current supplied from the rectifying circuit 110. The voltage increasing and reducing circuit 111 is provided by utilizing a part of the inverter 16. The voltage increasing and reducing circuit 111 includes the IGBTs 160c, 160f, the diodes 160i, 160l, a reactor 111a, IGBTs 111b, 111c, diodes 111d, 111e and a capacitor 111f.

The reactor 111a is an element that stores or releases energy when a current flows and induces a voltage. A first end of the reactor 111a is coupled to a series coupling point between the IGBT 160c and the IGBT 160f, and a second end of the reactor 111a is coupled to a coupling point between the IGBT 111b and the IGBT 111c.

Each of the IGBTs 160c, 160f, 111b, and 111c is a switching element. The energy is stored in or released from the reactor 111a in accordance with switching operations of the IGBTs 160c, 160f, 111b, and 111c. The IGBT 111b and the IGBT 111c are coupled in series to each other. In particular, an emitter of the IGBT 111b is coupled to a collector of the IGBT 111c. A series coupling point between the IGBT 111b and the IGBT 111c is coupled to the second end of the reactor 111a. A collector of the IGBT 111b is coupled to the relay 134. An emitter of the IGBT 111c is coupled to the emitters of the IGBTs 160d-160f. The collector of the IGBT 111b and the emitter of the IGBT 111c are coupled to the capacitor 111f. Gates of the IGBTs 160c, 160f, 111b, 111c are coupled to the control circuit 15.

The diodes 160i, 160l, 111d, and 111e are elements that allow the current generated when the IGBTs 160c, 160f, 111b, 111e are turned off and the energy stored in the reactor 111a is released. An anode of the diode 111d is coupled to the emitter of the IGBT 111b, and a cathode of the diode 111d is coupled to the collector of the IGBT 111b. Likewise, an anode of the diode 111e is coupled to the emitter of the IGBT 111c, and a cathode of the diode 111e is coupled to the collector of the IGBT 111c.

The capacitor 111f is an element that smoothes the direct current that has been increased or reduced in voltage. A first end of the capacitor 111f is coupled to the collector of the IGBT 111b, and a second end of the capacitor 111f is coupled to the emitter of the IGBT 111c. Also, the first end of the capacitor 111f is coupled to the relay 135, and the second end of the capacitor 111f is coupled to the relay 136.

The leak current detecting circuit 12 is coupled to the charging circuit 11. The leak current detecting circuit 12 detects, among a leak current flowing between the charging circuit 11 and the earth, a direct current component and an alternating current component caused by a change in voltage in accordance with the switching operations of the IGBTs and the alternating current source AC. In particular, the leak current detecting circuit 12 detects the leak current based on a difference between a current flowing between first input and output terminals and a current flowing between second input and output terminals.

Also, the leak current detecting circuit 12 is a circuit that determines whether the alternating current source AC is coupled to the charging device 1. In particular, the leak current detecting circuit 12 determines whether the alternating current source AC is coupled to the charging device 1 based on whether the charging device 1 is supplied with the alternating current.

The first input terminal of the leak current detecting circuit 12 is coupled to one of the output terminals of the alternating current source AC through the inlet 17. The second input terminal of the leak current detecting circuit 12 is coupled to the other of the output terminals of the alternating current source AC, which is grounded to the earth, through the inlet 17. The first output terminal of the leak current detecting circuit 12 is coupled to the relay 130, and the second output terminal of the leak current detecting circuit 12 is coupled to the relay 131. Also, the leak current detecting circuit 12 is coupled to the control circuit 15.

The relays 130, 131 are disposed between the leak current detecting circuit 12 and the charging circuit 11. The relays 130, 131 couple or decouple the alternating current source AC and the leak current detecting circuit 12 to or from the charging circuit 11. The relays 130, 131 couple the alternating current source AC and the leak current detecting circuit 12 to the charging circuit 11 when the high-voltage battery B is charged.

A first end of the relay 130 is coupled to the first output terminal of the leak current detecting circuit 12, and a second end of the relay 130 is coupled to the series coupling point between the IGBT 160a and the IGBT 160d. A first end of the relay 131 is coupled to the second output terminal of the leak current detecting circuit 12, and a second end of the relay 131 is coupled to the series coupling point between the IGBT 160b and the IGBT 160e. A control terminal of the relay 130 is coupled to the control circuit 15. Likewise, a control terminal of the relay 131 is coupled to the control circuit 15.

The relays 132, 133 are disposed between the inverter 16 and the motor M. The relays 132, 133 couple or decouple the inverter 16 to or from the motor M. The relays 132, 133 decouple the inverter 16 from the motor M when the high-voltage battery B is charged. A first end of the relay 132 is coupled to a U-phase terminal of the motor M, and a second end of the relay 132 is coupled to the series coupling point between the IGBT 160a and the IGBT 160d. A first end of the relay 133 is coupled to the W-phase terminal of the motor M, and a second end of the relay 133 is coupled to the series coupling point between the IGBT 160c and the IGBT 160f. A control terminal of the relay 132 is coupled to the control circuit 15. Likewise, a control terminal of the relay 133 is coupled to the control circuit 15.

The relay 134 is disposed between the inverter 16 and the relay 135. The relay 134 couples or decouples the inverter 16 to or from the high-voltage battery B through the relay 135. The relay 134 decouples the inverter 16 from the high-voltage battery B when the high-voltage battery B is charged. A first end of the relay 134 is coupled to the collectors of the IGBTs 160a-160c, and a second end of the relay 134 is coupled to the relay 135. A control terminal of the relay 134 is coupled to the control circuit 15.

The relays 135, 136 are disposed between the charging circuit 11 and the high-voltage battery B. The relays 135, 136 couple or decouple the charging circuit 11 to or from the high-voltage battery B. The relays 135, 136 couple the charging circuit 11 to the high-voltage battery B when the high-voltage battery B is charged. A first end of the relay 135 is coupled to the collector of the IGBT 111b, and a second end of the relay 135 is coupled to the positive terminal of the high-voltage battery B. A first end of the relay 136 is coupled to the emitter of the IGBT 111c, and a second end of the relay 136 is coupled to the negative terminal of the high-voltage battery B. A control terminal of the relay 135 is coupled to the control circuit 15. Likewise, a control terminal of the relay 136 is coupled to the control circuit 15. The relay 137 is disposed between the insulation resistance detecting circuit 10 and the high-voltage battery B. The relay 137 is an element that couples or decouples the insulation resistance detecting circuit 10 to or from the high-voltage battery B. The relay 137 decouples the insulation resistance detecting circuit 10 from the high-voltage battery B when the high-voltage battery B is charged. The relay 137 serves as a decoupling circuit. A first end of the relay 137 is coupled to the negative terminal of the high-voltage battery B, and a second end of the relay 137 is coupled to the first end of the coupling capacitor 100. A control terminal of the relay 137 is coupled to the control circuit 15.

The voltage sensor 14 is an element that detects a voltage of the high-voltage battery B and outputs a detection result. Input terminals of the voltage sensor 14 are coupled to the positive terminal and the negative terminal of the high-voltage battery B. An output terminal of the voltage sensor 14 is coupled to the control circuit 15.

The control circuit 15 controls the relays 130-137. Also, the control circuit 15 determines an abnormality on the leak current based on the leak current detected by the leak current detecting circuit 12. The control circuit 15 controls the charging circuit 11 based on the voltage of the high-voltage battery B detected by the voltage sensor 14. Further, the control circuit 15 determines an abnormality on the insulation resistance based on the insulation resistance detected by the detection circuit 104 after the charging is finished. Moreover, the control circuit 15 controls the inverter 16.

The control circuit 15 is coupled to the control terminals of the relays 130-137, the output terminal of the leak current detecting circuit 12 and the output terminal of the voltage sensor 14. Also, the control circuit 15 is coupled to the gates of the IGBTs 160a-160f, 111b, 111c. Further, the control circuit 15 is coupled to the output terminal of the detection circuit 104.

Next, an operation of the charging device will be described with reference to FIGS. 1 and 2.

As shown in FIG. 1, when the high-voltage battery B mounted in the vehicle is charged, the alternating current source AC is coupled to the charging device 1. In this case, the vehicle body is coupled to the earth.

Figure 2:
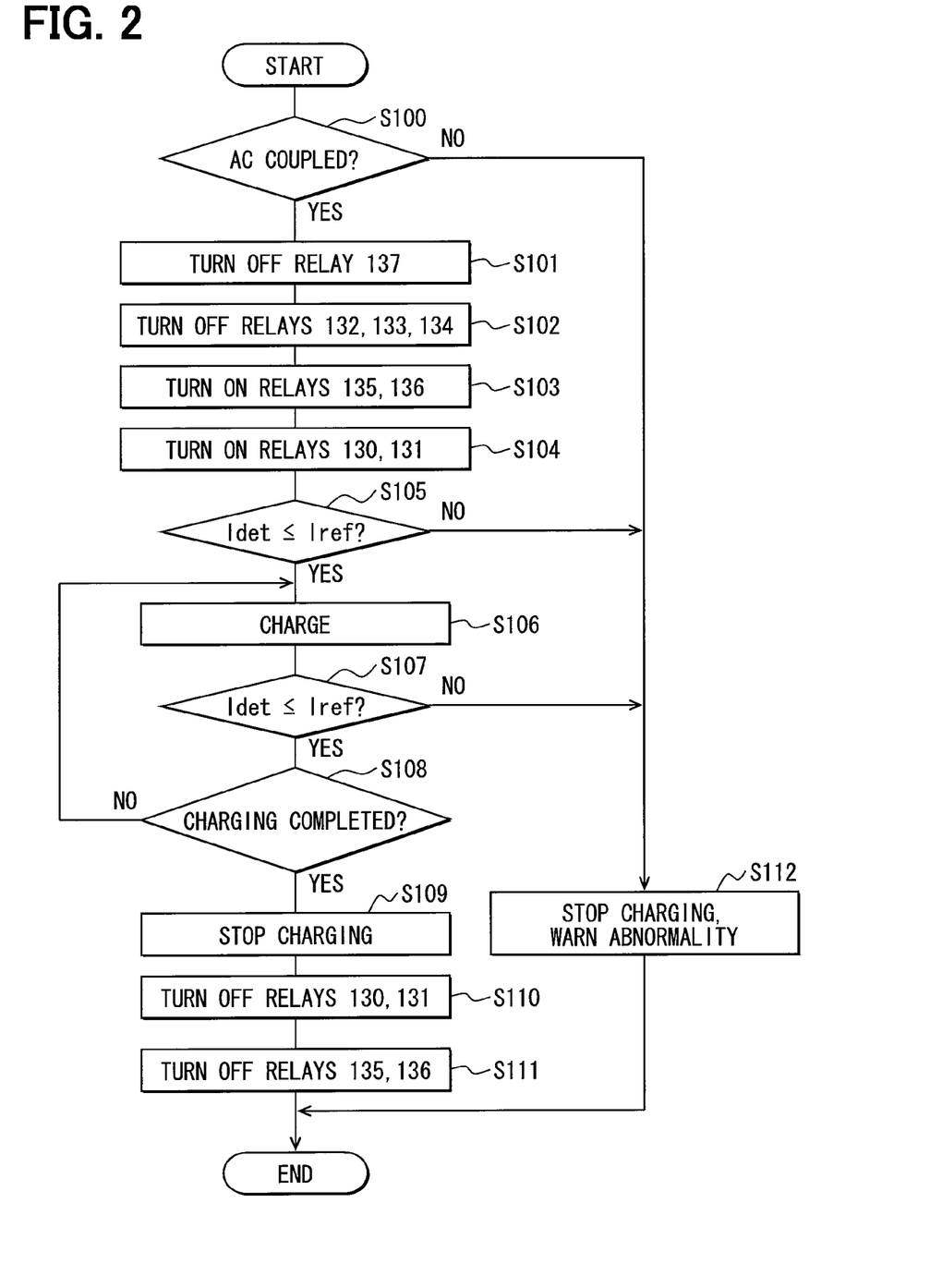
FIG. 2 is a flowchart illustrating an operation of the charging device according to the first embodiment.

As shown in FIG. 2, the control circuit 15 determines whether the alternating current source AC is coupled to the charging device 1 based on the detection result of the leak current detecting circuit 12 (S100).

When it is determined that the alternating current source AC is coupled to the charging device 1 (S100: YES), the control circuit 15 turns off the relay 137 such that the insulation resistance detecting circuit 10 is decoupled from the high-voltage battery B (S101). The control circuit 15 turns off the relays 132, 133 such that the inverter 16 is decoupled from the motor M. Also, the control circuit 15 turns off the relay 134 such that the inverter 16 is decoupled from the high-voltage battery B (S102).

The control circuit 15 turns on the relays 135, 136 such that the charging circuit 11 is coupled to the high-voltage battery B (S103). The control circuit 15 turns on the relays 130, 131 such that the charging circuit 11 is coupled to the alternating current source AC and the leak current detecting circuit 12 (S104).

Next, the control circuit 15 determines whether a leak current $I_{det}$ detected by the leak current detecting circuit 12 is equal to or less than a reference value $I_{ref}$ (S105).

When it is determined that the leak current $I_{det}$ is equal to or less than the reference value $I_{ref}$ (S105: YES), because the insulation resistance is sufficiently ensured, the control circuit 15 begins charging of the high-voltage battery B (S106). In particular, the IGBTs 160a, 160b, 160d, 160e are turned off, and the alternating current supplied from the alternating current source AC is rectified into the direct current by means of the diodes 160g, 160h, 160j, 160k. Further, the IGBT 160c and the IGBT 111c are turned on and off or the IGBTs 160c, 160f and the IGBTs 111b, 111c are complementarily turned on and off based on the voltages of the alternating current source AC and the high-voltage battery B, so that the voltage of the direct current supplied from the rectifying circuit 110 is increased or reduced and the high-voltage battery B is charged.

During the charging, the control circuit 15 determines whether the leak current $I_{det}$ detected by the leak current detecting circuit 12 is equal to or less than the reference value $I_{ref}$, similar to the S105 (S107).

When it is determined that the leak current $I_{det}$ is equal to or less than the reference value $I_{ref}$ (YES: S107), the control circuit 15 determines whether the charging is completed or not based on the voltage of the high-voltage battery B detected by the voltage sensor 14 (S108).

When it is determined that the charging is not completed (S108: NO), the process returns to the S106 to continue the charging. When it is determined that the charging is completed (S108: YES), the control circuit 15 stops the charging of the high-voltage battery B (S109). In particular, the control circuit 15 turns off the IGBTs 160c, 160f, 111b, 111c.

Next, the control circuit 15 turns off the relays 130, 131 such that the charging circuit 11 is decoupled from the alternating current source AC and the leak current detecting circuit 12 (S110). Also, the control circuit 15 turns off the relays 135, 136 such that the charging circuit 11 is decoupled from the high-voltage battery B (S111). Then, the control circuit 15 ends the process.

When it is determined that the charging device 1 is not coupled to the alternating current source AC (S100: NO), or when it is determined that the leak current $I_{det}$ is greater than the reference value $I_{ref}$ (S105, S107: NO), the control circuit 15 stops the charging and warns an abnormality (S112). Then, the control circuit 15 ends the process.

When the process shown in FIG. 2 is ended, the coupling between the alternating current source AC and the charging device 1 is released, and the coupling between the vehicle body and the earth is released, the control circuit 15 turns on the relay 137 to couple the insulation resistance detecting circuit 10 to the high-voltage battery B. Further, the control circuit 15 determines whether the insulation resistance between the high-voltage battery B and the vehicle body has an abnormality based on the insulation resistance detected by the detection circuit 104.

Next, advantageous effects will be described.

Figure 3:
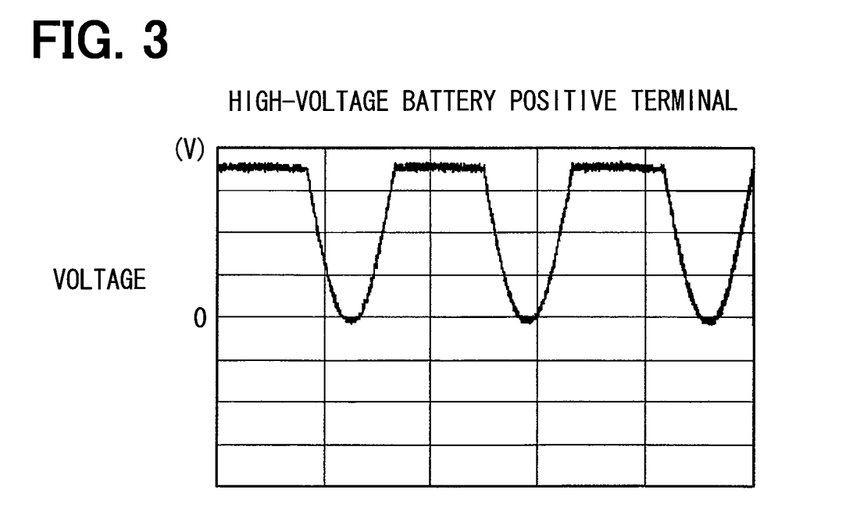
FIG. 3 is a diagram illustrating a waveform of a voltage at a positive terminal of a high-voltage battery shown in FIG. 1.
Figure 4:
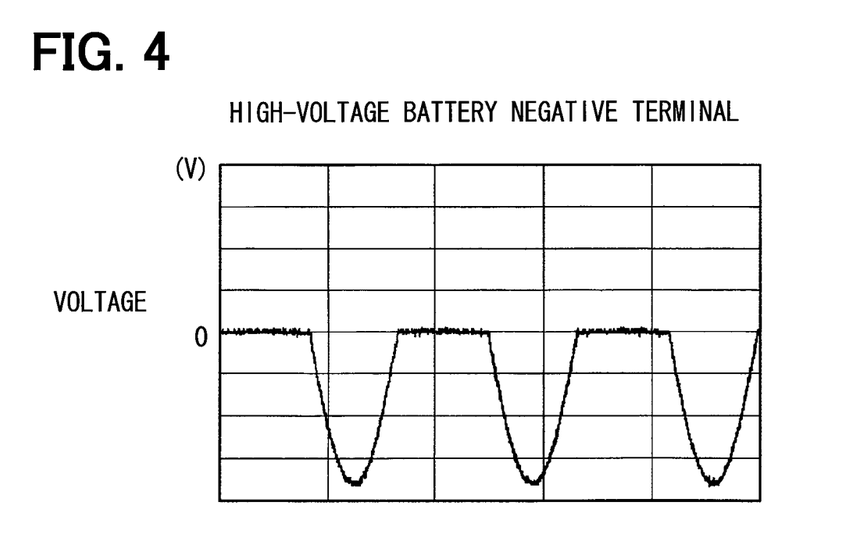
FIG. 4 is a diagram illustrating a waveform of a voltage at a negative terminal of the high-voltage battery shown in FIG. 1.

The output terminal of the alternating current source AC is coupled to the earth as the reference. The charging circuit 11 does not include a transformer that insulates the input side and the output side of the charging circuit 11, and thus the input side and the output side are not insulated. Therefore, as shown in FIG. 3, the voltage of the positive terminal of the high-voltage battery B relative to 0 V, that is, relative to the earth changes with time. Likewise, as shown in FIG. 4, the voltage of the negative terminal of the high-voltage battery B relative to 0 V, that is, relative to the earth changes with time.

In a case where the insulation resistance detecting circuit 10 is coupled to the high-voltage battery B, the current flows from the vehicle body to the earth through the coupling capacitor 100, and hence the high-voltage battery B is not charged. In the present embodiment, on the other hand, the insulation resistance detecting circuit 10 is decoupled from the high-voltage battery B when the high-voltage battery B is charged. Therefore, it is less likely that the current will flow from the vehicle body to the earth through the coupling capacitor 100.

Accordingly, even if the input side and the output side of the charging circuit 11 are not insulated, the high-voltage battery B can be properly charged. Also, the leak current detecting circuit 12 that can detect an AC component and a DC component of the leak current is employed. Therefore, even if the insulation resistance detecting circuit 10 is decoupled from the high-voltage battery B, the decrease in insulation resistance can be detected as the leak current by the leak current detecting circuit 12.

The charging circuit 11 is provided by utilizing the inverter 16 that supplies electric power to the motor M for driving the in-vehicle compressor. Therefore, the size of the charging circuit 11 reduces.

In the present embodiment, as described above, the decrease in insulation resistance can be detected as the leak current by the leak current detecting circuit 12. When the detected leak current $I_{det}$ exceeds the reference value $I_{ref}$, the charging of the high-voltage battery B is stopped. Therefore, it is less likely that the charging will be continued in a state where the insulation resistance is insufficient.

Second Embodiment

A second embodiment of the present disclosure will be described with reference to FIG. 5.

In the charging device of the first embodiment, the decrease of the insulation resistance is detected by the leak current detecting circuit 12 during the charging. In a charging device of the second embodiment, on the other hand, the decrease of the insulation resistance is detected by the insulation resistance detecting circuit 10 before the charging.

The charging device of the second embodiment is similar to the charging device of the first embodiment, except for the leak current detecting circuit 12 and the operation of the control circuit 15.

First, a structure of the charging device 1 of the second embodiment will be described with reference to FIG. 1.

The charging device 1 includes the insulation resistance detecting circuit 10, the charging circuit 11, the leak current detecting circuit 12, the relays 130-137, the voltage sensor 14 and the control circuit 15. Differently from the first embodiment, the leak current detecting circuit 12 detects only an AC component of the leak current flowing between the charging circuit 11 and the earth and being caused by the voltage change in accordance with switching of each IGBT and the alternating current source AC. Other structures are similar to the first embodiment.

Next, an operation of the charging device 1 of the second embodiment will be described with reference to FIGS. 1 and 5.

As shown in FIG. 1, when the high-voltage battery B mounted in the vehicle is charged, the alternating current source AC is coupled to the charging device 1. In this case, the vehicle body is coupled to the earth.

Figure 5:
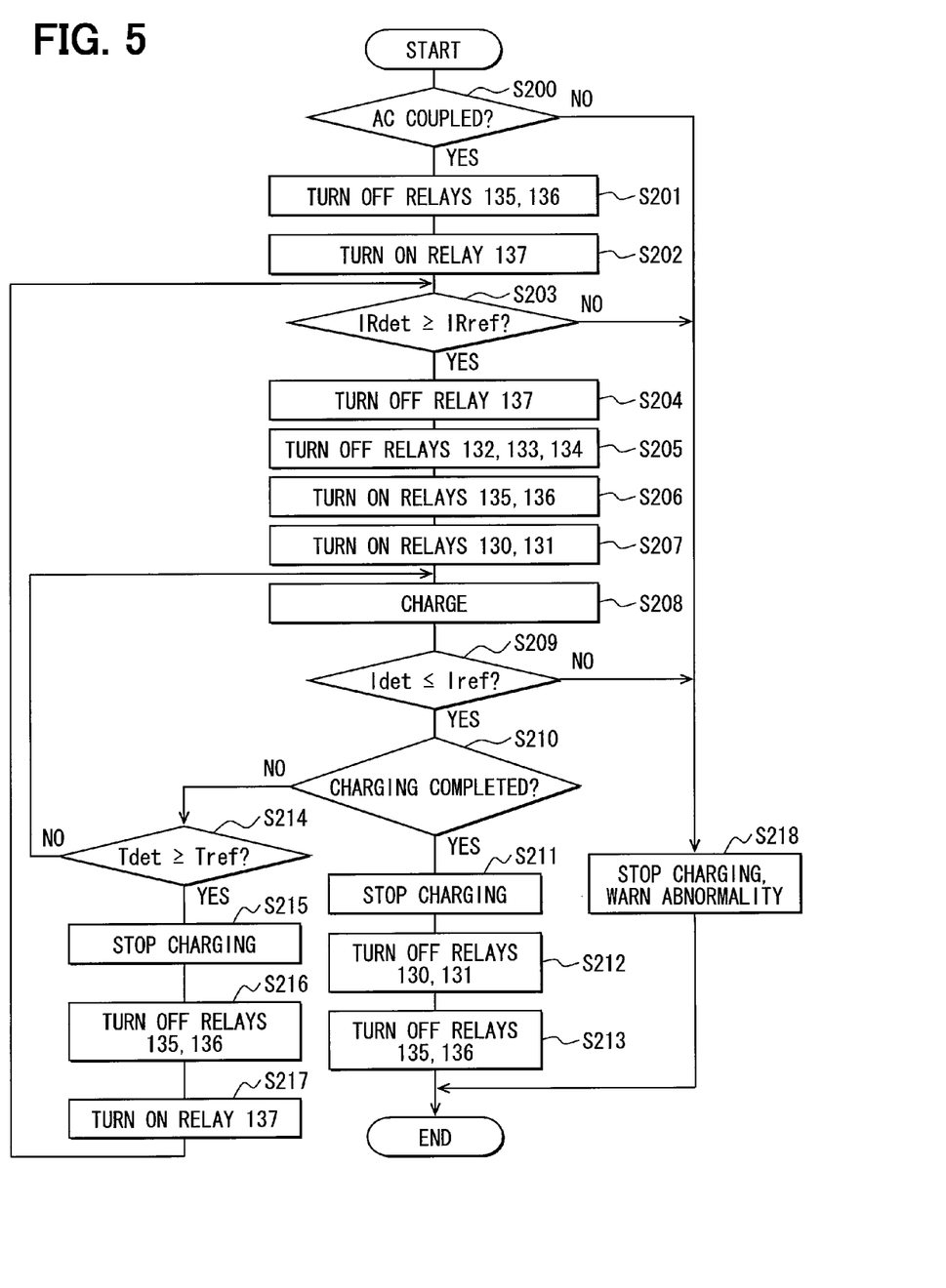
FIG. 5 is a flowchart illustrating an operation of a charging device according to a second embodiment of the present disclosure.

As shown in FIG. 5, the control circuit 15 determines whether the alternating current source AC is coupled to the charging device 1 based on the detection result of the leak current detecting circuit 12 (S200).

When it is determined that the alternating current source AC is coupled to the charging device 1 (S200: YES), the control circuit 15 turns off the relays 135, 136 such that the charging circuit 11 is decoupled from the high-voltage battery B (S201). The control circuit 15 turns on the relay 137 such that the insulation resistance detecting circuit 10 is coupled to the high-voltage battery B (S202).

The control circuit 15 determines whether an insulation resistance $IR_{det}$ detected by the insulation resistance detecting circuit 10 is equal to or greater than a reference value $IR_{ref}$ (S203)

When it is determined that the insulation resistance $IR_{det}$ is equal to or greater than a reference value $IR_{ref}$ (S203: YES), the relay 137 is turned off such that the insulation resistance detecting circuit 10 is decoupled from the high-voltage battery B (S204). The relays 132, 133 are turned off such that the inverter 16 is decoupled from the motor M, and the relay 134 is turned off such that the inverter 16 is decoupled from the high-voltage battery B (S205). The relays 135, 136 are turned on such that the charging circuit 11 is coupled to the high-voltage battery B (S206). The relays 130, 131 are turned on such that the charging circuit 11 is coupled to the alternating current source AC and the leak current detecting circuit 12 (S207).

Next, the control circuit 15 begins the charging of the high-voltage battery B (S208). In particular, the IGBTs 160a, 160b, 160d, 160e are turned off, and the alternating current supplied from the alternating current source AC is rectified into the direct current by means of the diodes 160g, 160h, 160j, 160k. Further, the IGBT 160c and the IGBT 111c are turned on or off, or the IGBTs 160c, 160f and the IGBTs 111b, 111c are complementally turned on or off based on the voltages of the alternating current source AC and the high-voltage battery B, so that the voltage of the direct current supplied from the rectifying circuit 110 is increased or reduced and the high-voltage battery B is charged.

During the charging, the control circuit 15 determines whether the leak current $I_{det}$ detected by the leak current detecting circuit 12 is equal to or less than the reference value $I_{ref}$ (S209) The leak current detecting circuit 12 detects only the AC component of the leak current, the AC component being caused by the change in voltage in accordance with the switching of each IGBT and the alternating current source AC.

When it is determined that the leak current $I_{det}$ is equal to or less than the reference value $I_{ref}$ (S209: YES), the control circuit 15 determines whether the charging is completed based on the voltage of the high-voltage battery B detected by the voltage sensor 14 (S210).

When it is determined that the charging is completed (S210: YES), the charging is stopped. (S211) In particular, the IGBTs 160c, 160f, 111b, 111c are turned off. Further, the relays 130, 131 are turned off such that the charging circuit 11 is decoupled from the alternating current source AC and the leak current detecting circuit 12 (S212). The relays 135, 136 are turned off such that the charging circuit 11 is decoupled from the high-voltage battery B (S213). Then, the process ends.

When it is determined that the charging is not completed (S210: NO), the control circuit 15 determines whether a predetermined time period has elapsed from the beginning of the charging (S214). Namely, the control circuit 15 determines whether a time period $T_{det}$ elapsed from the beginning of the charging is equal to or greater than a reference time period $T_{ref}$. In this case, the reference time period $T_{ref}$ is set to a period necessary to complete the charging from the beginning of the charging when the insulation resistance is equal to or greater than the reference value $IR_{ref}$.

When it is determined that the time period $T_{det}$ elapsed from the beginning of the charging is equal to or greater than the reference time period $T_{ref}$ (S214: YES), the charging is stopped, similar to the S211 (S211). The relays 135, 136 are turned off such that the charging circuit 11 is decoupled from the high-voltage battery B (S216). The relay 137 is turned on such that the insulation resistance detecting circuit 10 is coupled to the high-voltage battery B (S217). Then, the process returns to the S203. When it is determined that the time period $T_{det}$ elapsed from the beginning of the charging is less than the reference time period $T_{ref}$ (S214: NO), the process returns to the S208 to continue the charging.

When it is determined that the alternating current source AC is not coupled to the charging device 1 (S200: NO), when it is determined that the insulation resistance $IR_{det}$ is less than the reference value $IR_{ref}$ (S203: NO), or when it is determined that the leak current $I_{det}$ is greater than the reference value $I_{ref}$ (S209: NO), the charging is stopped and an abnormality is warned (S218). Then, the process ends.

When the process shown in FIG. 5 ends, and when the coupling between the alternating current source AC and the charging device 1 and the coupling between the vehicle body and the earth are released, the control circuit 15 turns on the relay 137 such that the insulation resistance detecting circuit 10 is coupled to the high-voltage battery B. Then, the control circuit 15 determines whether the insulation resistance between the high-voltage battery B and the vehicle body has an abnormality based on the insulation resistance detected by the detection circuit 104.

Next, advantageous effects of the present embodiment will be described.

In the second embodiment, similar to the first embodiment, the high-voltage battery B can be properly charged even when the input side and the output side of the charging circuit 11 are not insulated.

In the second embodiment, the insulation resistance is detected by the insulation resistance detecting circuit 10 before the charging of the high-voltage battery B. When the insulation resistance before the charging is less than the reference value, the charging of the high-voltage battery B is not performed. Therefore, it is less likely that the charging of the high-voltage battery B will be performed in a state where the insulation resistance is insufficient.

In such a case, it is not necessary to detect the decrease in the insulation resistance by the leak current detecting circuit 12, as the first embodiment. Therefore, it is sufficient that the leak current detecting circuit 12 only detects the AC component of the leak current. Namely, since the leak current detecting circuit 12 does not need to detect the DC component of the leak current, the size of the leak current detecting circuit 12 reduces. Also, the manufacturing costs reduce.

In the second embodiment, the charging is stopped when the charging is not completed in the reference time period from the beginning of the charging. Therefore, it is less likely that the charging will be continued in an abnormal state.

In the first and second embodiments described above, the relay 137 is exemplarily disposed between the insulation resistance detecting circuit 10 and the high-voltage battery B. However, the arrangement of the relay 137 may be modified. For example, the relay 137 may be disposed between the insulation resistance detecting circuit 10 and the vehicle body. Also in this case, the similar advantageous effects will be achieved.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A charging device for charging a battery of a vehicle, the charging device comprising:
    an insulation resistance detecting circuit including a coupling capacitor, the insulation resistance detecting circuit being disposed between the battery and a vehicle body for detecting an insulation resistance between the battery and the vehicle body;
    a charging circuit having an input terminal to be coupled to an alternating current source and an output terminal to be coupled to the battery, the charging circuit converting an alternating current supplied from the alternating current source into a direct current and charging the battery in a state without insulating the input terminal and the output terminal and in a state where the vehicle body is coupled to an earth;
    a leak current detecting circuit being coupled to the charging circuit, the leak current detecting circuit detecting a leak current flowing between the charging circuit and the earth;
    a decoupling circuit coupling and decoupling the insulation resistance detecting circuit to and from the battery; and
    a control circuit controlling the decoupling circuit, wherein:
    the insulation resistance detecting circuit is configured so that a current flows from the battery to the vehicle body through the coupling capacitor in a state where the insulation resistance detecting circuit is coupled to the battery through the decoupling circuit, and
    the control circuit controls the decoupling circuit to decouple the insulation resistance detecting circuit from the battery so that the coupling capacitor is decoupled from the battery to prohibit the electric current from the battery to the vehicle body through the coupling capacitor, when the charging circuit is coupled to the alternating current source to charge the battery.

2. The charging device according to claim 1, wherein the charging circuit includes a power converter that supplies electric power to a motor of the vehicle.

3. The charging device according to claim 1, wherein the charging circuit includes a power converter that supplies electric power to a motor that drives a compressor of the vehicle.

4. The charging device according to claim 1, wherein the charging circuit stops the charging of the battery when the leak current detected by the leak current detecting circuit is greater than a reference current.

5. The charging device according to claim 1, wherein the insulation resistance detecting circuit detects the insulation resistance before the charging of the battery, and the charging circuit prevents the charging of the battery when the insulation resistance detected by the insulation resistance detecting circuit before the charging is less than a reference insulation resistance.

6. The charging device according to claim 1, wherein the charging circuit stops the charging of the battery when the charging is not completed in a predetermined time period from a beginning of the charging.

* * * * *